United States Patent [19]

Bass et al.

[11] Patent Number: 5,487,170
[45] Date of Patent: Jan. 23, 1996

[54] DATA PROCESSING SYSTEM HAVING DYNAMIC PRIORITY TASK SCHEDULING CAPABILITIES

[75] Inventors: Brian M. Bass; Edward H. Ku; Bou-Chung Lin; Simin H. Sanaye, all of Wake, N.C.

[73] Assignee: International Business Machines Corporation, Armonk, N.Y.

[21] Appl. No.: 168,616

[22] Filed: Dec. 16, 1993

[51] Int. Cl.⁶ .............................. G06F 13/16; G06F 9/46
[52] U.S. Cl. .......................... 395/732; 395/650; 395/293; 364/228; 364/242.6; 364/242.7; 364/242.8; 364/281.3; 364/281.8; 364/240; 364/DIG. 1; 340/825.51; 370/85.6
[58] Field of Search ...................... 395/725, 325, 395/275, 800; 340/825.5, 825.51; 370/85.2, 85.6

[56] References Cited

U.S. PATENT DOCUMENTS

| | | | |
|---|---|---|---|
| 4,302,808 | 11/1981 | Zanchi et al. | 395/325 |
| 4,320,467 | 3/1982 | Glass | 395/325 |
| 4,602,327 | 7/1986 | LaViolette et al. | 395/325 |
| 4,669,079 | 5/1987 | Blum | 370/85.6 |
| 4,897,833 | 1/1990 | Kent et al. | 370/85.2 |
| 4,920,485 | 4/1990 | Vahidsafa | 395/725 |
| 4,969,120 | 11/1990 | Azevedo et al. | 395/325 |
| 4,987,529 | 1/1991 | Craft et al. | 395/325 |
| 5,193,189 | 3/1993 | Flood et al. | 395/650 |
| 5,210,871 | 5/1993 | Lala et al. | 395/650 |
| 5,212,795 | 5/1993 | Hendry | 395/725 |
| 5,263,163 | 11/1993 | Holt et al. | 395/725 |
| 5,280,591 | 1/1994 | Garcia et al. | 395/325 |
| 5,280,621 | 1/1994 | Barnes et al. | 395/800 |
| 5,303,382 | 4/1994 | Buch et al. | 395/725 |
| 5,317,696 | 5/1994 | Hilgendorf | 395/325 |

*Primary Examiner*—Gopal C. Ray
*Attorney, Agent, or Firm*—Joscelyn G. Cockburn

[57] ABSTRACT

A data processing system includes a server which has a task scheduler for receiving task requests for access, and granting access to system resources based upon a multidimensional scheduling technique wherein groups of tasks are assigned a priority level within a priority scheme, and within each group round robin scheduling assures each task will have access to system resources in turn and a dynamically programmable technique for responding to requests from time-dependent isochronous requests for system resources.

10 Claims, 12 Drawing Sheets

DATA PROCESSING SYSTEM HAVING DYNAMIC PRIORITY TASK SCHEDULING CAPABILITIES

FIELD OF THE INVENTION

The present invention relates to data processing systems, and more particularly to data processing systems having the capability of assigning priority to a number of substantially simultaneous requests for service by the data processing system.

In many data processing systems, there are often simultaneous requests for access to various resources within the data processing system.

A task scheduler is a device which determines the priority and order of execution of several simultaneous task requests and gives the "winning" task a signal to proceed. In many ways, a task scheduler is similar to a traffic signal where cars approach an intersection simultaneously and the traffic signal controls which car will have the right of way. The traffic signal is a task scheduler.

There are several different ways for a task scheduler to determine which task to give access to system resources. Each scheduling technique has advantages and disadvantages.

For example, a "highest priority" system gives each requesting task a priority and always gives the winning signal to the highest priority requesting task. The advantage of this technique is that each task can be given an importance, and the most "important" task will always execute first. This technique is also easiest to implement. The disadvantage of the highest priority technique is that high priority tasks can "hog" the resources and block out lower priority tasks from ever executing. Also, if two or more devices need to have the same priority, one must be given preference over the others and will have more access to the resources than lower priority tasks.

A round robin technique gives each task the same priority and ensures that each task request gets access to system resources in turn. A simple traffic light is a good example of a round robin scheme wherein each lane gets its turn until every lane has had an opportunity and then the pattern repeats. The advantage of this method is that each requesting task gets its fair share of system resources and is assured of getting a turn. The disadvantage of the round robin technique is that lower priority tasks get as much of the system resources as the higher priority tasks.

In a time division access technique, each task is given a predetermined amount of time to execute and then the system proceeds to the next task. Each task is assigned a window of time and gets to execute during that window. When its time window is complete, the next task gets its turn. A task does not get another chance until its next time window occurs. The advantage of this technique is that each task is given a chance to execute, and no task can hog the resources. Also, the amount of time each task will have access and the time between accesses are predetermined and can be used to support time critical protocols such as isochronous data transmissions. The disadvantage of the time division technique is that a task may not have anything to do during its window of time, and therefore that time would be wasted since no other task can use the resources. As can be seen from the above discussion, each task scheduler technique has advantages and disadvantages. The dynamic priority task scheduling technique according to the present invention provides a fair, efficient technique that supports task priority, round robin, and isochronous data transfers.

SUMMARY OF THE INVENTION

Therefore, it is a primary object of the present invention to handle a number of tasks simultaneously requesting access to system resources in a manner which provides for priority between groups of tasks, equal access within groups of tasks, and provides for access for time dependent isochronous tasks.

Accordingly, a data processing system embodying the present invention includes a server which has a task scheduler for receiving task requests for access, and granting access to system resources based upon a multidimensional scheduling technique wherein groups of tasks are assigned a priority level within a priority scheme, and within each group round robin scheduling assures each task will have access to system resources in turn and a dynamically programmable technique for responding to requests from time-dependent isochronous requests for system resources.

It is a significant advantage of the present invention that task scheduling can be accomplished which will accommodate time dependent requests for system access as well as a prioritization scheme and a round robin technique which assures that all requests for access to system resources by any task will be provided access in turn and that no task will be locked out from access.

The foregoing and other objects, features, and advantages of the invention will be apparent from the following more particular description of a preferred embodiment of the invention as illustrated in the accompanying drawing in which like reference characters referred to the same parts throughout the different figures.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
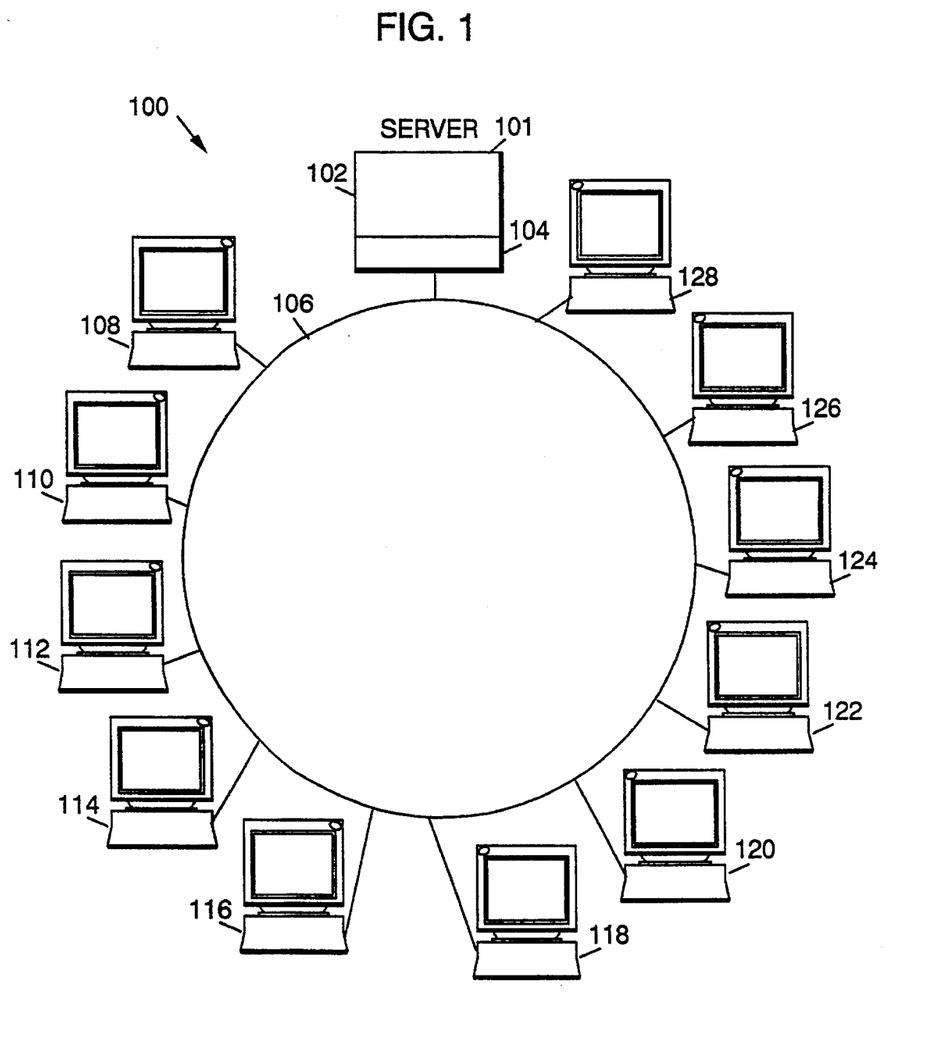
FIG. 1 is a block diagram of a data processing system according to the present invention having a number of devices which may simultaneously request access to system resources.

Referring now to FIG. 1, a data processing system 100 having a server 101 and a number of requesting devices connected to a network 106 will be described. The server 101 has a control and processing unit 102 and an interface unit 104 both of which will be described in more detail below. The server 101 is connected through interface unit 104 to one or more networks such as 106 which may be local area networks, wide area networks, or nationwide or international data transmission networks or the like. Stations 108, 110, 112, 114, 116, 118, 120, 122, 124, 126, 128 are representative of stations which may be connected to network 106 or other networks which may have a need to raise a request for access to system resources through server 102 and interface unit 104.

Figure 2:
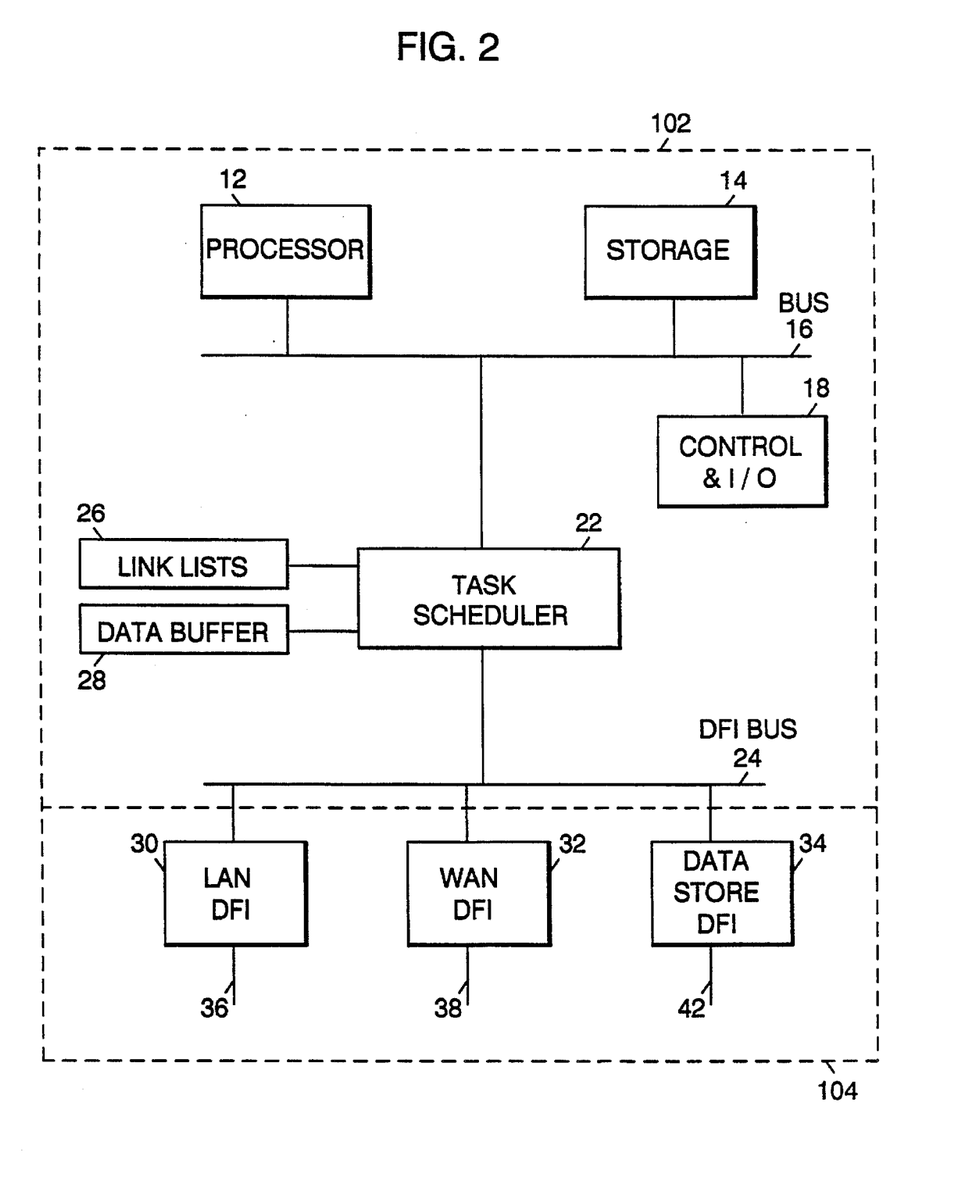
FIG. 2 is a block diagram of the server shown in FIG. 1 according to the present invention.

Referring now to FIG. 2, a server will be described in further detail.

Control and processing unit 102 includes a processor 12, a storage unit 14, a processor subsystem bus 16, a local control and input/output unit 18 such as might be required for communicating with devices such as printers, keyboards, displays, and the like, and task scheduler 22. Processor 12, storage unit 14, and local control and input/output unit 18 connected to processor system bus 16 perform the usual functions of control, processing, storage and input/output which are commonly done by those elements in a Von Neumann computer architecture system. Task scheduler 22 controls the grant of requests for access to system resources and manages data buffers. Information regarding requests for access is stored in link list 26 and associated data is stored in data buffer 28. Both link list 26 and data buffer 28 operate under the control of task scheduler 22. Task scheduler 22 controls the flow of data on data flow interface bus 24 which connects the control and processing unit 102 to the network interface unit 104.

Network interface unit 104 includes a number of data flow interface units such as local area network interface unit 30, wide area network interface unit 32, and data storage interface unit 34. Local area network (LAN) data flow interface unit 30 is connected to a network such as 106 by lines 36. Wide area network (WAN) data flow interface unit 32 is connected to a network (not shown) by lines 38 and data flow interface 34 is connected to a data storage network (not shown) by lines 42.

For the purpose of the present invention, one network is sufficient to illustrate the apparatus and method according to the present invention.

Figure 3:
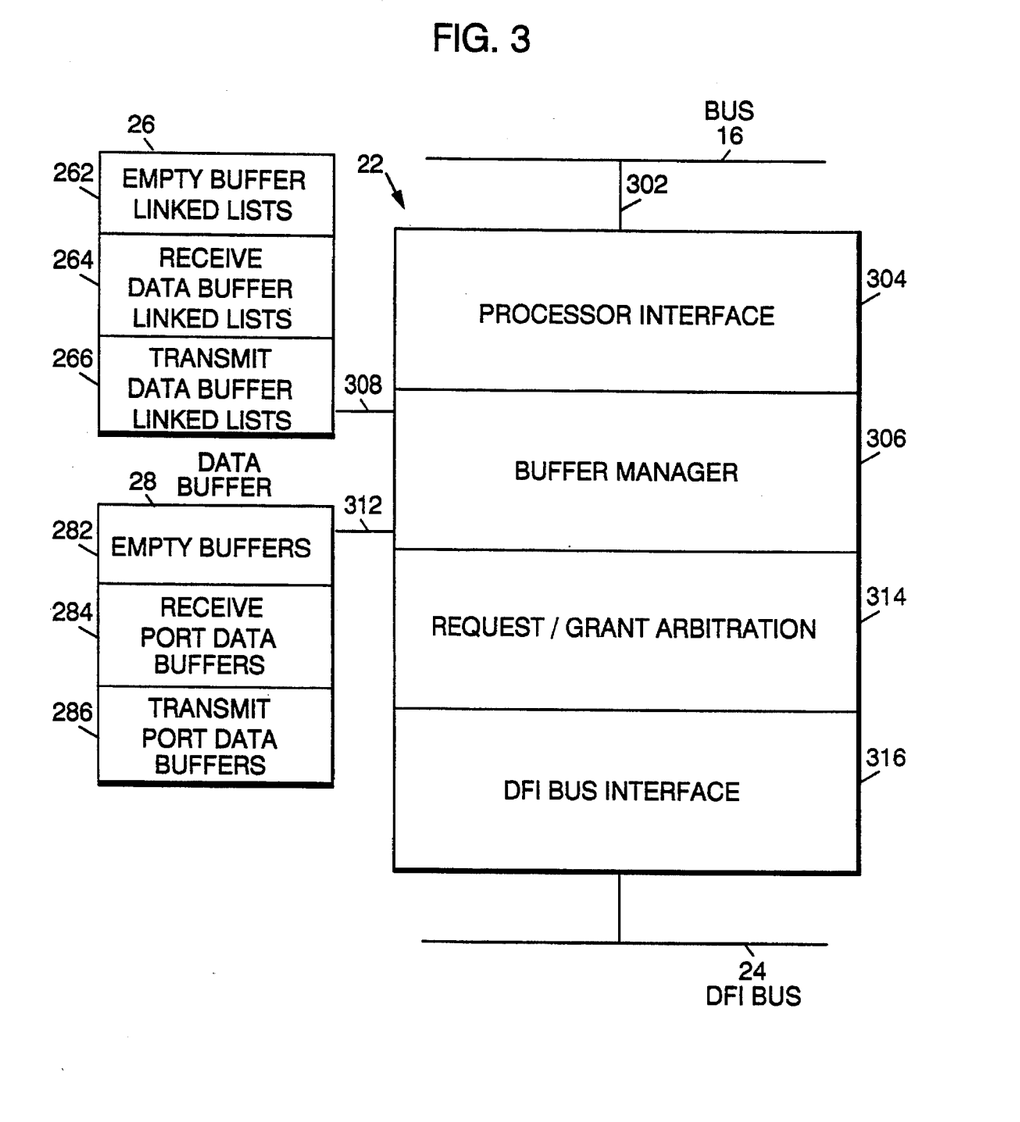
FIG. 3 is a block diagram of the task scheduler of FIG. 2 according to the present invention.

Referring now to FIG. 3, task scheduler 22 will be described in further detail.

A processor interface 304 in task scheduler 22 is connected by lines 302 to processor bus 16. Buffer manager 306 controls and maintains link lists 26 connected to buffer manager 306 by line 308 and data buffers 28 connected to buffer manager 306 by line 312. Linked lists 26 store the buffer linked lists for three types of buffers. Linked lists 26 stores address pointers to three categories of data buffers in data buffers 28. Linked lists of empty buffers are stored in section 262 of linked lists 26, receive data buffer linked lists are stored in section 264, and transmit data buffer linked lists are stored in section 266. Data buffers 28 contains three categories of buffers which match the linked lists which contains pointers to the three categories of data buffers in data buffers 28. Data buffers 28 contained empty buffers 282, receive port data buffers 284, and transmit port data buffers 286. Buffer manager 306 manages the buffer linked lists operations. A data flow interface unit such as LAN DFI 30 presents a request to buffer manager 306 for one or more empty buffers in which to store received data. Buffer manager 306 assigns one or more empty buffers to LAN DFI 30 and removes the empty buffer pointer from the empty buffer linked lists 262. Buffer manager 306 then creates a receive port data buffer linked list associated with the request from LAN DFI 30. The receive port data buffer linked list is stored in section 264 of linked lists 26. The data flow interface unit 30 then causes the received data to be stored in the receive port data buffers 284 assigned by buffer manager 306. When the data frame has been completely stored in receive port data buffers 284, LAN DFI 30 identifies a target port to buffer manager 306. Buffer manager 306 then transfers the data buffer linked list associated with the received data to a transmitted data buffer linked list which is stored in 266, and a notice is sent to the target port of the arrival of the data in data buffer 28 by buffer manager 306. After the data has been completely transferred to the target port, the target port releases the transmit data buffer 286, and buffer manager 306 places the pointers associated with the released buffers to the empty buffer linked lists 262.

Request/grant arbitration unit 314 responds to and grants requests based upon the arbitration strategy in accordance with the present invention. Data flow interface (DFI) bus interface 316 communicates between task scheduler 22 and data flow interface bus 24.

Figure 4:
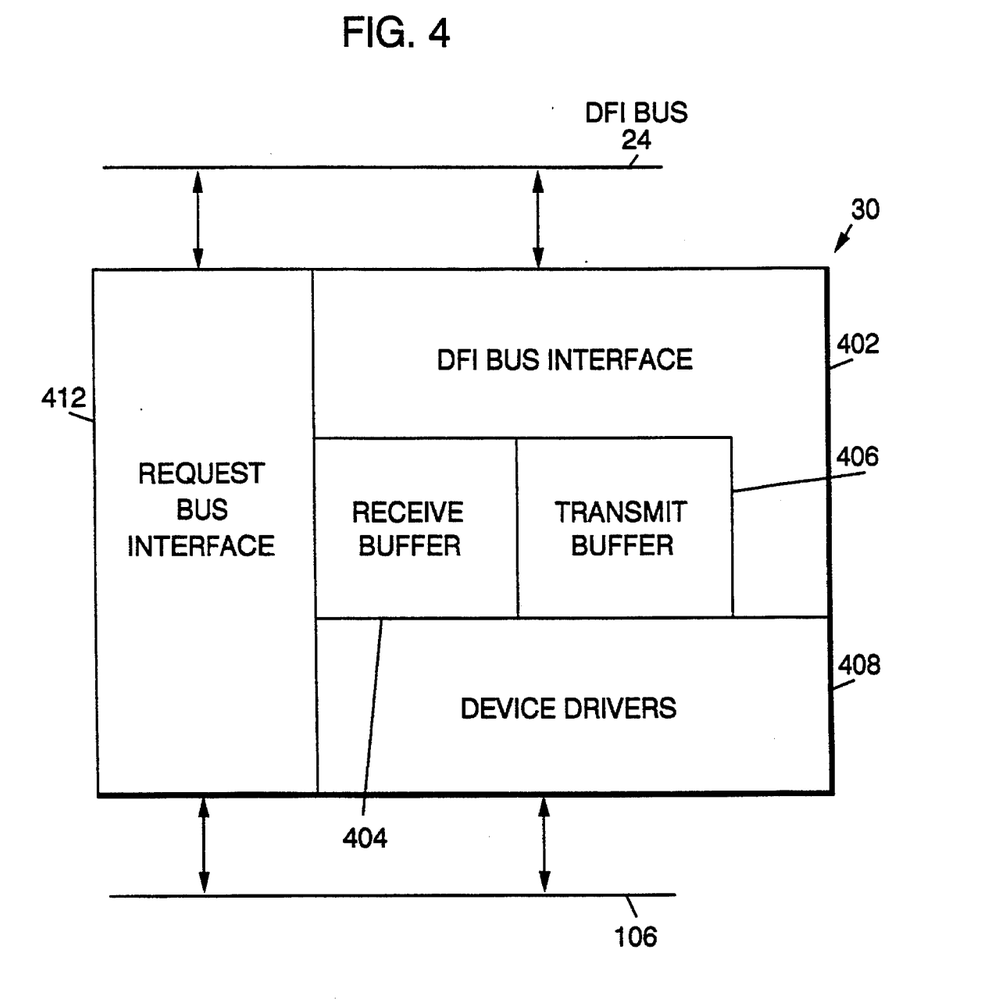
FIG. 4 is a block diagram of a data flow interface adaptor as shown in FIG. 3 in accordance with the present invention.

Referring now to FIG. 4, a representative data flow interface unit such as LAN DFI unit 30 will be described. DFI unit 30 includes a data flow interface bus interface 402 which provides communication between data flow interface 24, received buffer 404, transmit buffer 406, and device drivers 408. Device drivers 408 communicate with the network such as network 106 shown in FIG. 1 above. Interface 402, buffers 404 and 406 and device drivers 408 operate to transmit data between the external network 106 and data flow interface bus 24.

A request for access to system resources from another device such as device 108 connected to network 106 is presented as an input to request bus interface 412 which communicates the request through DFI bus 24 to request/grant arbitration unit 314 in task scheduler 22 (see FIG. 3).

A typical data flow for system 100 is as follows:

Data arrives on line 36 at LAN DFI unit 30. DFI unit 30 issues a request for a free buffer to task scheduler 22. Task scheduler 22 issues an address pointer to a free buffer to LAN DFI unit 30. The data on line 36 is then moved into the buffer by LAN DFI unit 30 through task scheduler 22 to data buffer 28. If more space is required, LAN DFI unit 30 issues another request to task scheduler 22 for free buffer space. At the end of the data string input on line 36, LAN DFI unit 30 issues a command to task scheduler 22 to enqueue the data packet to a target data flow interface unit such as another LAN DFI, a WAN DFI such as 32, the data stored unit DFI unit 34, or processor 12. Task scheduler 22 places the data packet into the target DFI units queue which is stored in link list 26. Task scheduler 22 then raises a flag to the target DFI unit such as WAN DFI 32 to indicate a change in the queue status for the target DFI unit. WAN DFI 32 (the target DFI unit) reads the updated queue status. The target DFI (WAN DFI 32) issues a command to task scheduler 22 to obtain packet data, and task scheduler 22 returns information to WAN DFI 32 indicating data packet location and data length.

The target DFI 32 then moves the data packet from the data buffer 28 into its local buffer such as transmit buffer 406 (see FIG. 4) for further processing. When the movement of the data packet is completed, the target DFI 32 raises a flag to task scheduler 22 indicating that the data move is completed. Task scheduler 22 then frees the data buffer 28 used for the operation for use on a subsequent data transfer operation.

OPERATION OF THE PREFERRED EMBODIMENT OF THE INVENTION

When more than one request for access to system resources is presented to task scheduler 22, tasks are granted access in accordance with a predetermined overall priority in which programmable time requests (isochronous time dependent requests) are granted highest priority, group 1 requests are next followed by group 2 requests, group 3 requests, etc. to the last or lowest priority which is group N requests where N is the highest group number requesting service at any time in the system. If a time dependent task is requesting use of system resources and its programmable time request is also active, it will be granted access. If the programable time request is active, but the task is not requesting use of resources, then task scheduler 22 will give the grant of access to the highest priority group requesting access to system resources. The task within such highest priority group whose turn is active according to a round robin scheme and is also requesting access to system resources will receive the grant of access.

Figure 5:
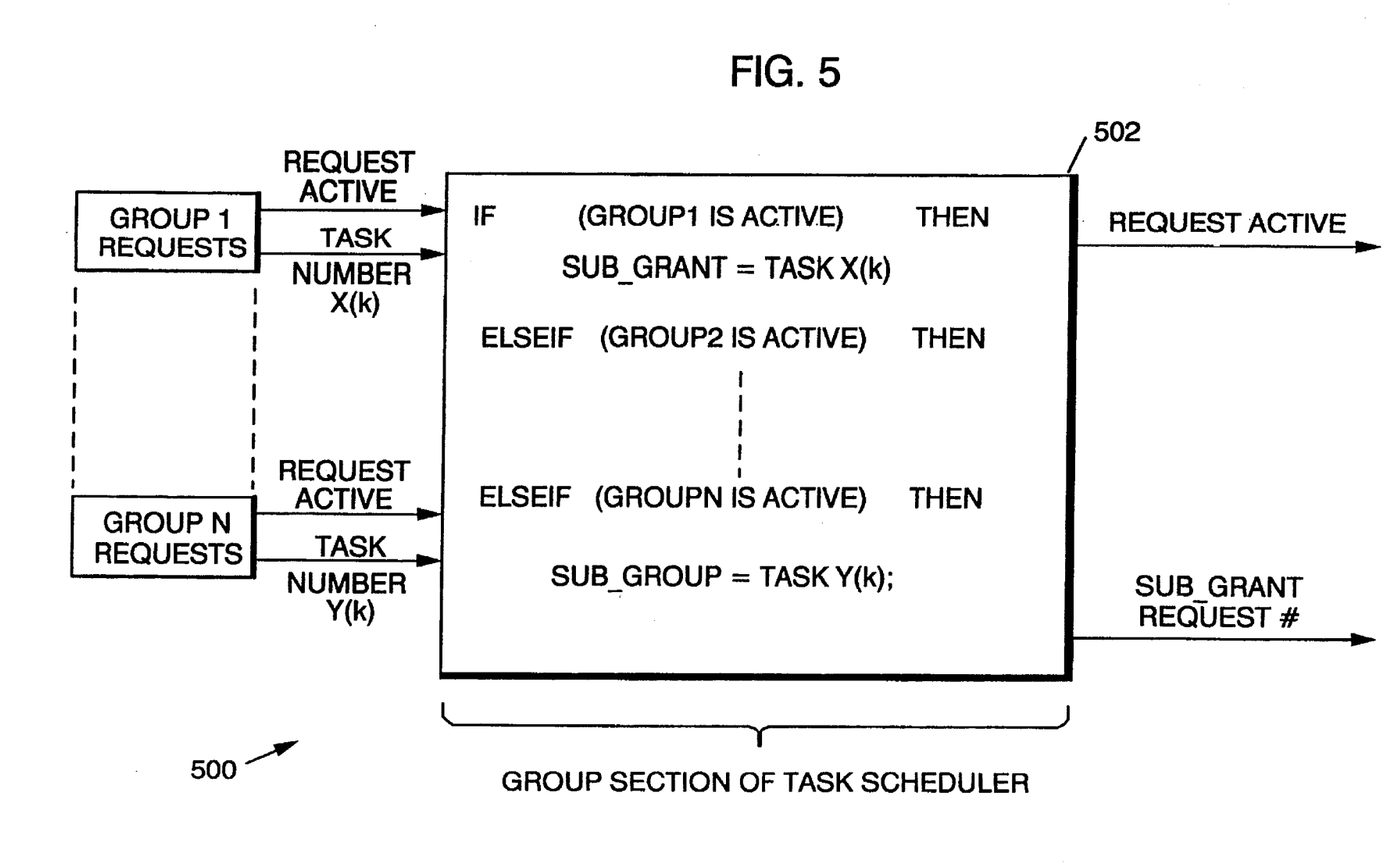
FIG. 5 is a block diagram of the process for determining priority among group requests according to the present invention.

Referring now to FIG. 5, the process for handling group requests will be described.

Each group of tasks is assigned a priority from highest to lowest. For example, group 1 may be assigned a highest priority and group N may be assigned a lowest priority. If, for example, a task from group 1 [task X(k)] is requesting access, a request active line is raised to the group section 502 of task scheduler 22. If group 1 is active, task X(k) is subgranted access before any task of a lower priority group.

Figure 6:
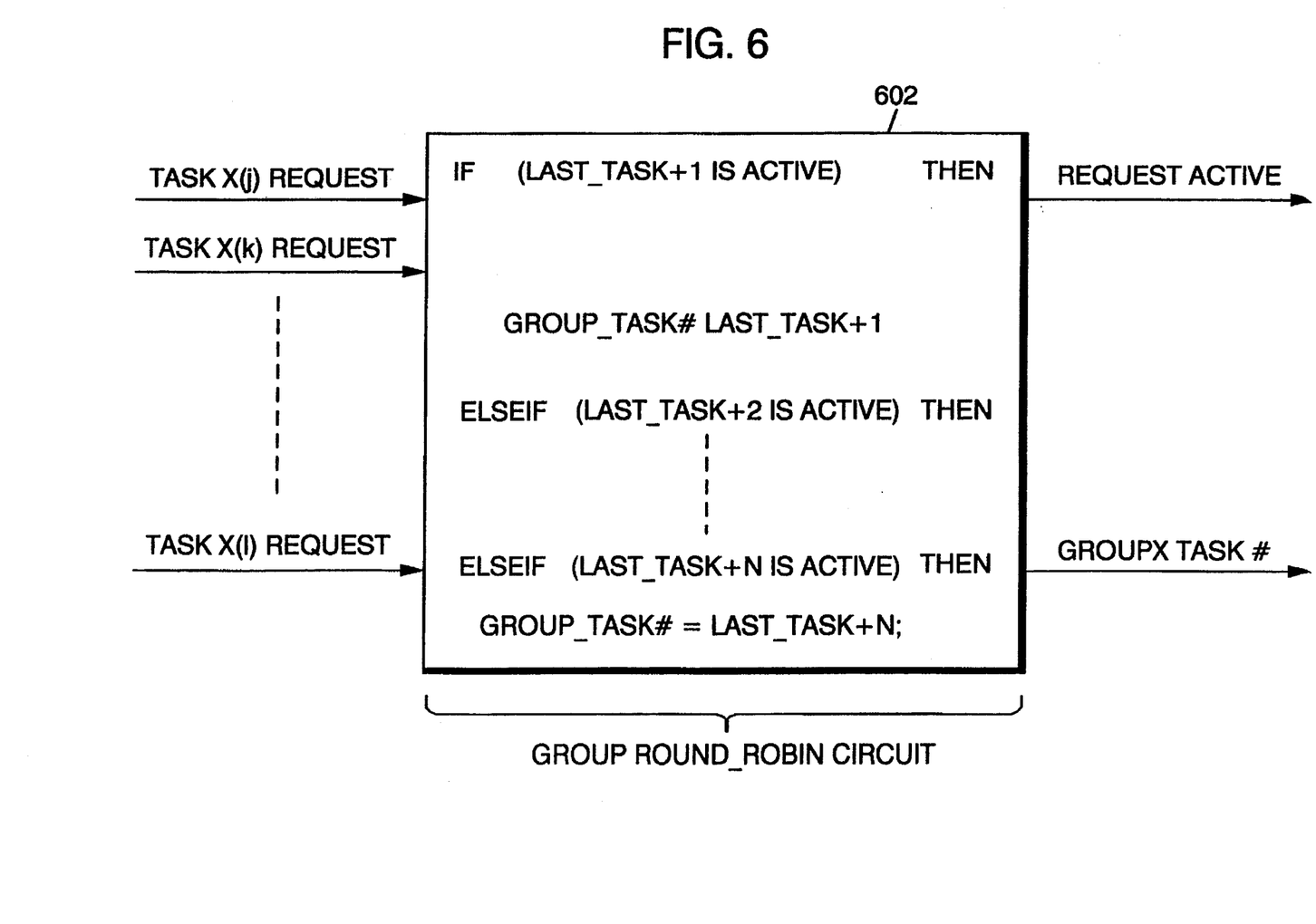
FIG. 6 is a diagram showing the group round robin control technique in accordance with the present invention.

If there is more than one task from a particular group which is requesting access to system resources at any time, the group round robin circuit 602 of task scheduler 22 resolves the conflict.

Referring now to FIG. 6, if a plurality of tasks all from a single group such as task X(j), task X(k), etc. are all requesting access to system resources, group round robin circuit 602 controls the granting of access to tasks in the same group in a manner similar to a traffic control signal. Group round robin circuit 602 stores the task number of the last task in the group to have been granted access and updates that storage as each next task in the group is granted access in turn. Thus, one by one, all tasks in the group are granted access in turn. An exception might occur if a higher priority group or a time dependent isochronous task requests access to system resources.

Figure 7:
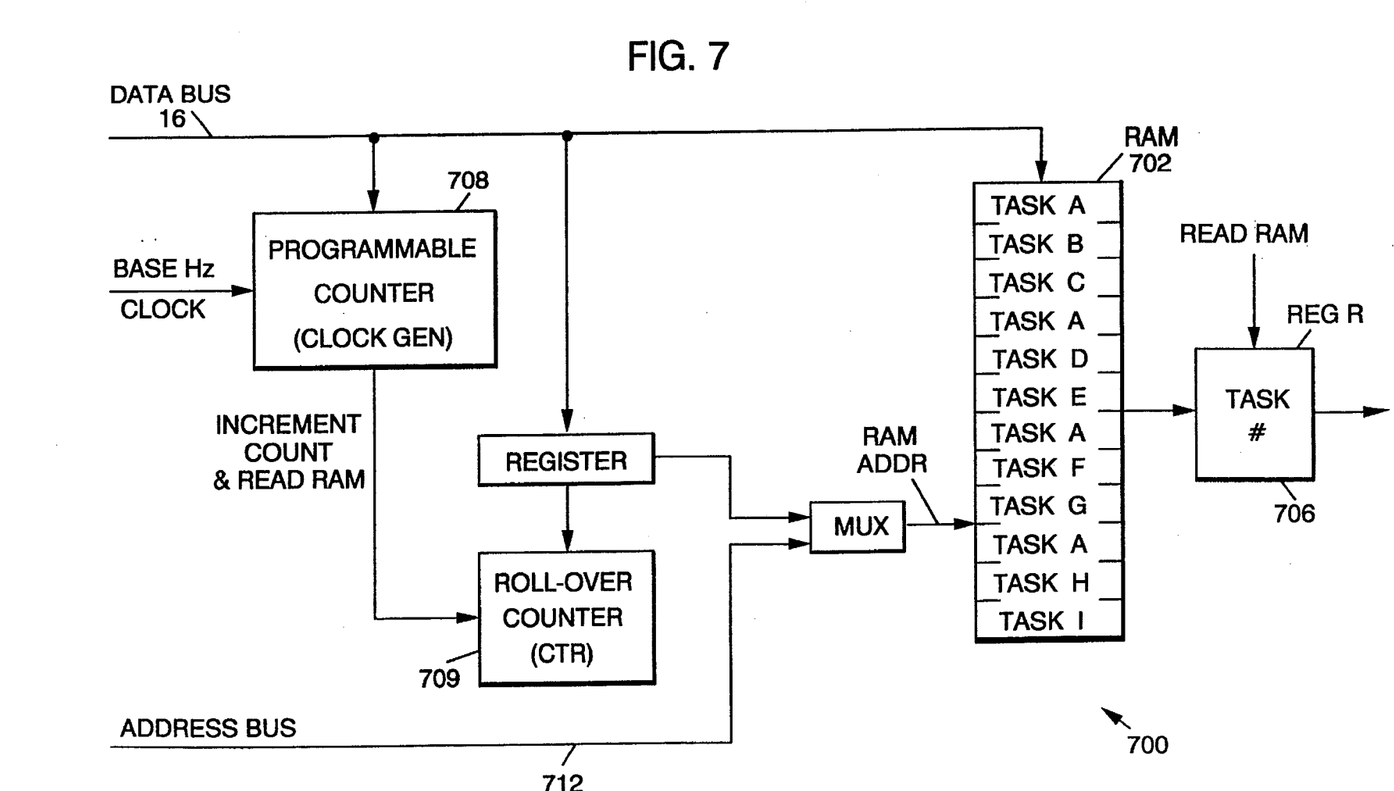
FIG. 7 is a block diagram of the programmable time scheduling circuit in accordance with the present invention.
Figure 12:
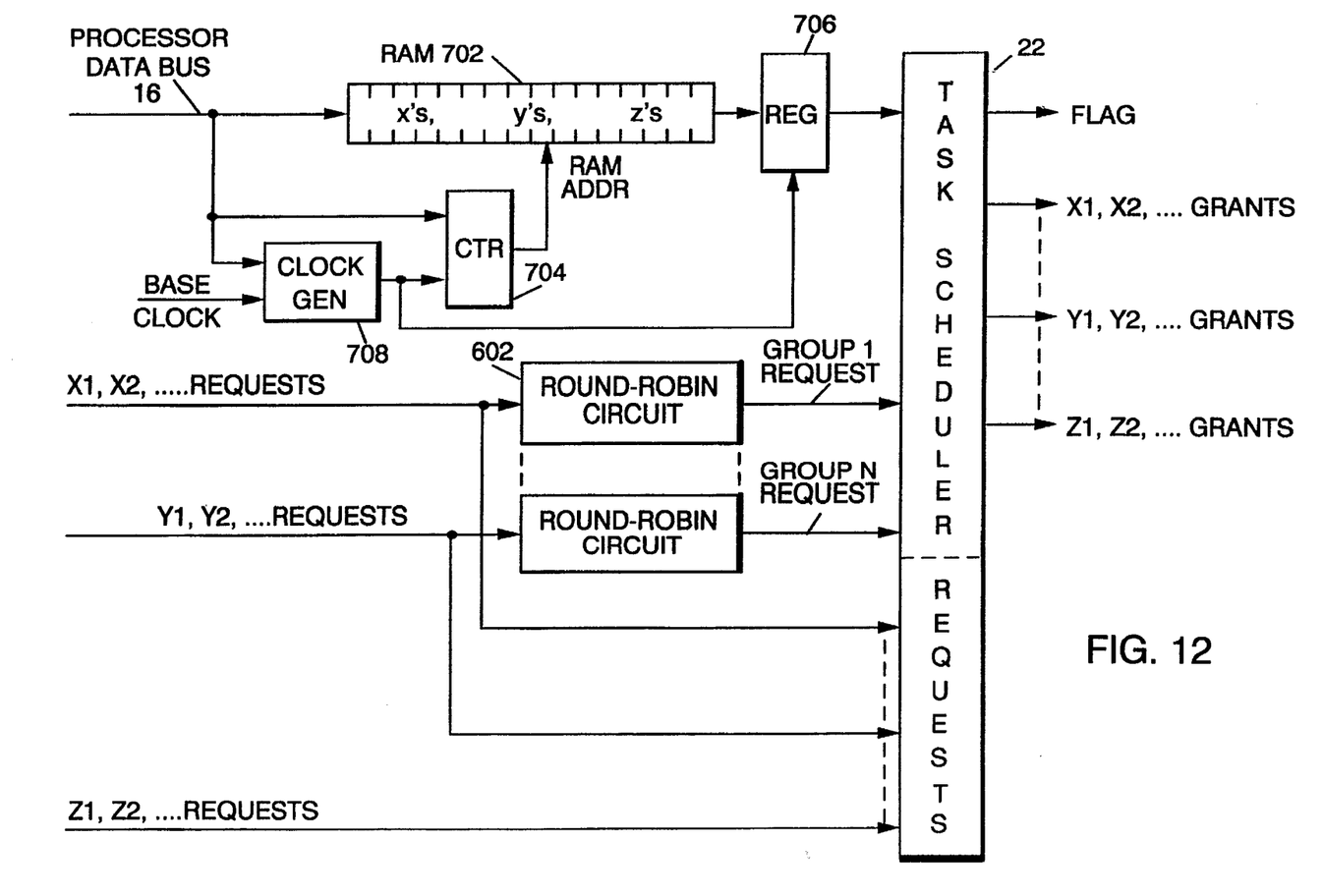
FIG. 12 is a block diagram of elements of a task scheduler according to the present invention.

Referring now to FIG. 7 and to FIG. 12, the programmable time scheduling circuit 700 of task scheduler 22 will be described for handling isochronous or time dependent task requests. Each task requiring isochronous support will have its task number written in task sequence random access memory (RAM) 702. The order of tasks in RAM 702 will determine the order of each task's time period. If certain tasks require support more often than others, the task number can be written into RAM 702 more than once. (Note task A appears four times in the example shown in FIG. 7.) As address counter 704 increments through all addresses in RAM 702, register 706 is updated with the last value read from RAM 702. Register 706 stores a task number. The value in register 706 determines which task is given a particular time period. If that task is also requesting use of system resources, that task will receive the final grant from task scheduler 22. If the task is not requesting use of system resources during its allocated time period, the final grant will be based on group priority requests as described above with respect to FIGS. 5 and 6. As the programmable clock generator circuit 708 which is loaded with an initial value from processor 12 completes a cycle, address counter 704 increments and points to the next location in RAM 702. The value in register 706 will be updated, and another task number will be given the particular time slot. Since the programmable counter 708 is programmable under the control of processor 12, the time period length for each task can be updated as needed by processor 12. The count value initially stored in programmable counter 708 will determine the length of time that any task can have a highest priority time slot and how often the time window will change. Address bus 712 and data bus 16 allows processor 12 to initialize RAM 702 with the desired task sequence and allows processor 12 to store a desired time period value in programmable counter 708. Using a base clock signal as an input, programmable counter 708 generates an increment/read pulse once each time period. The counter will be reloaded with the original value stored in programable 708 and continue counting. The increment/read pulse will go to rollover counter 704 (which is the address counter for RAM 702) and increment rollover counter 704 to a next value. Rollover counter 704 may also be programmable to allow the address range of RAM 702 to be altered as needed by processor 12. Rollover counter 704 is used as RAM 702 address during normal operation. The increment/read pulse will also read RAM 702 and store the value in register 706. The output of register 706 provides an input to the final grant portion of task scheduler 22 as shown in FIG. 8.

Figure 8:
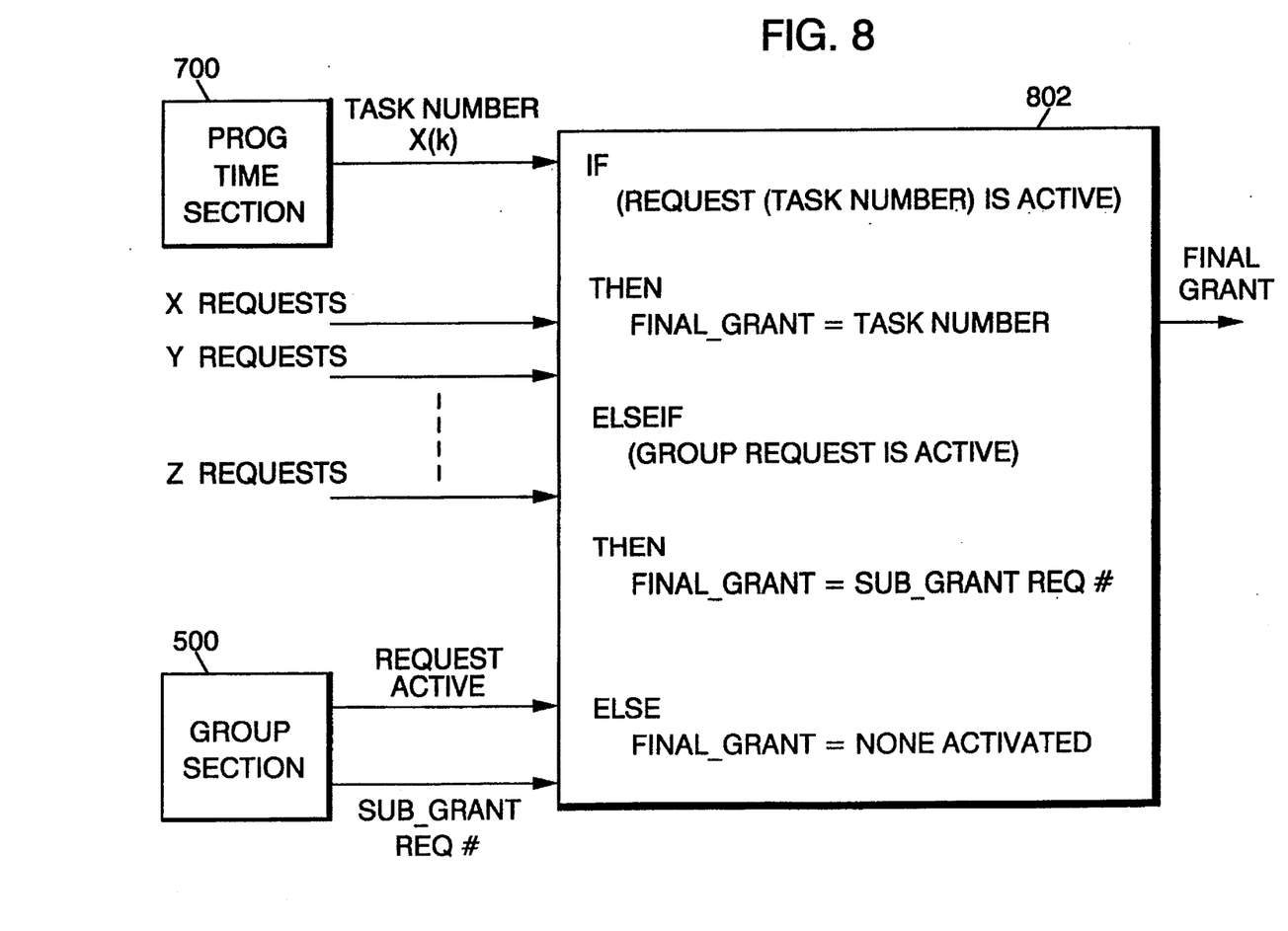
FIG. 8 is a block diagram of a portion of the task scheduler of FIG. 3 showing the process for final grant of access to a particular task.

Referring now to FIG. 8, the final grant section 802 of task scheduler 22 will be described. As final grant section 802 receives inputs from programmable time section 700 and group section 500, a first determination is made as to whether any task is currently active. If so, then such task is given final grant of access to system resources. If a time dependent task is not active, a determination is made if any group request is active. If a group request is active, then final grant of access to system resources is granted to the subgrant request task number from group priority circuit 502.

Figure 9:
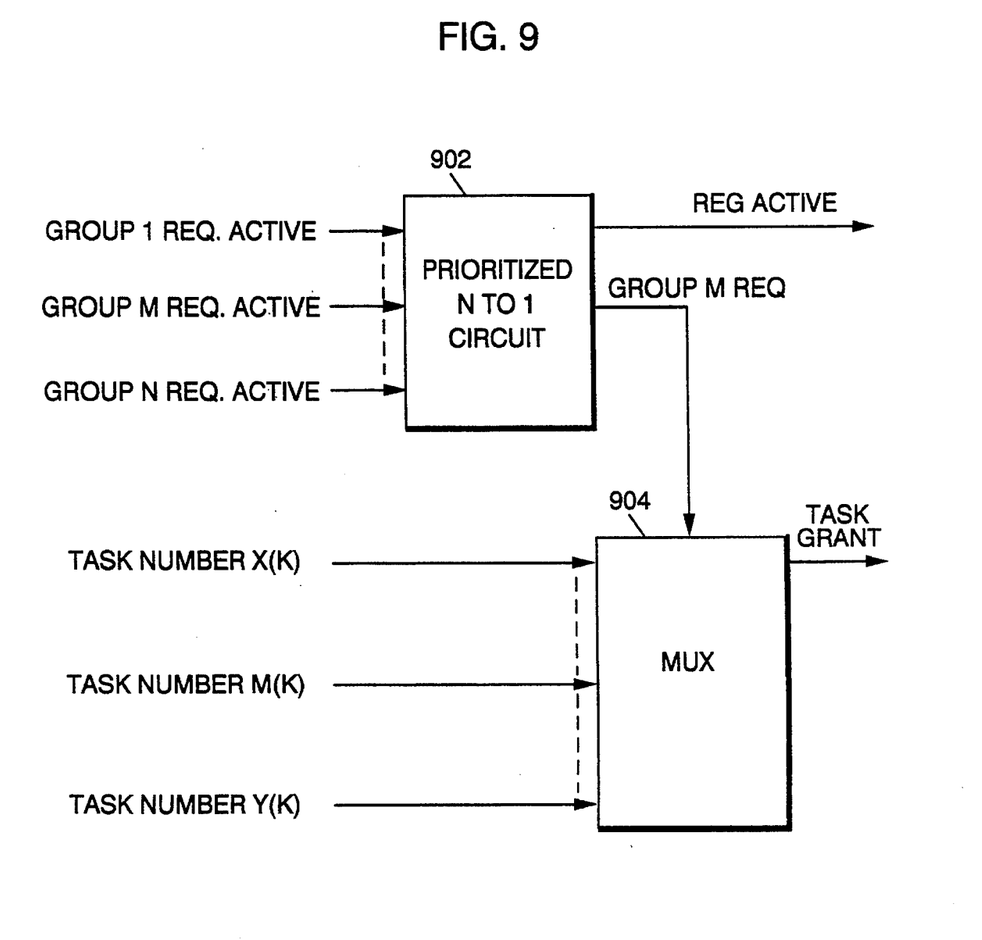
FIG. 9 is a circuit diagram showing prioritization of a number of requests in accordance with the present invention.

Referring now to FIG. 9, a circuit for determining priority level among requests from different groups will be described. A number of active requests from groups 1, M, and N are presented to prioritization circuit 802. (Circuits for establishing a priority level among a number of inputs are well-known in the art and will not be described in detail in this application.) The highest priority active request will provide an output to multiplexer 804. As an example, assume that there is an active request from group M and an active request from group N and that there is no active request from any group having a higher priority than group M where the highest priority is group 1 and the lowest priority is group N. Prioritization circuit 802 will provide two outputs. A first output indicates that there is an active request (see FIG. 5), and a second output to multiplexer 804 identifies the highest priority group (in this case group M) having an active request. Multiplexer 804 then selects the task associated with the highest priority group (group M) and provides an output (Task Grant) with an associated task identification number.

Figure 10:
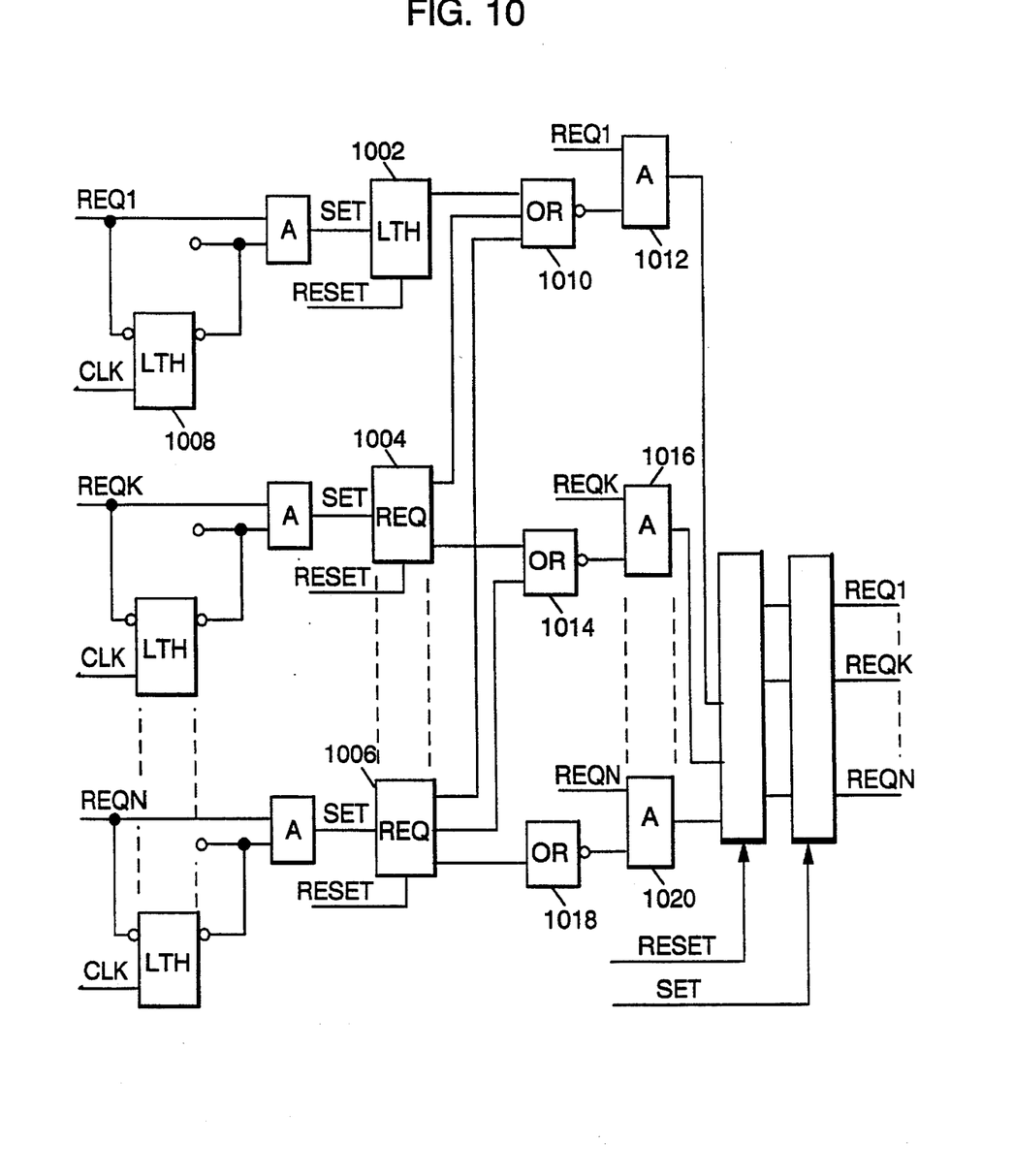
FIG. 10 is a circuit diagram showing the round robin access control in accordance with the present invention.

Referring now to FIG. 10, and to FIG. 6, a logic implementation of a round robin selection circuit will be described. Each request (REQ 1, REQ K, REQ N) is connected as one input to an AND gate which allows each request to set the associated latch 1002, 1004, 1006, one time for each cycle such that if, for example, request 1 should become active a second time before the round robin cycle has been completed, request 1 would be inhibited by latch 1008 from setting latch 1002. Thus, as each request REQ 1, REQ K, ... REQ N becomes active in turn, it is allowed to set its associated request latch 1002, 1004, 1006 once for each round robin cycle. Select logic made up of AND and OR gates 1010, 1012, 1014, 1016, 1018, and 1020 allow a particular request such as request 1 to be granted access to system resources only if its associated latch such as latch 1002 is set indicating that request 1 is active during its turn in the round robin scheme.

Figure 11:
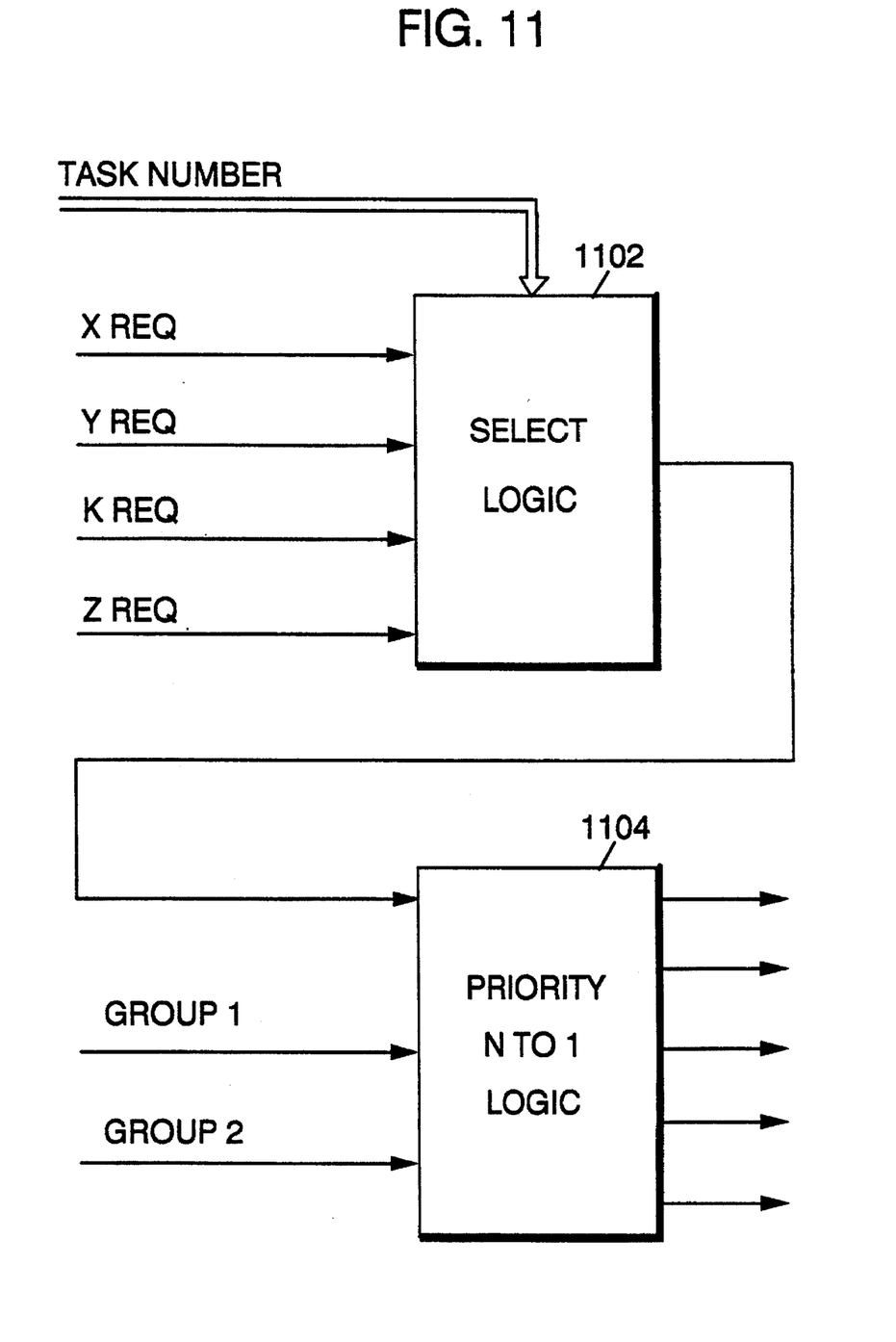
FIG. 11 is a schematic diagram showing select logic and priority logic in accordance with aspects of the present invention.

Referring now to FIG. 11, select logic 1102 matches a task number having a predetermined time period for access to system resources as was described above with reference to FIG. 7 with its associated active request (such as K REQ). Only if the request is active during its assigned period will the output from select logic 1102 take priority in priority logic 1104 over the priority assigned to groups of non-time-dependent tasks. The isochronous tasks always have the highest priority in priority circuit 1104, but claim that priority only if there is a match between task number and request in select logic 1102. If there is no match output from select logic 1102, then the group request having the highest priority will be granted access to system resources.

Referring again to FIG. 12, all of the task scheduling mechanisms described above are shown in a single diagram with the programmable task scheduling circuit near the top of the diagram and a group requests and round robin circuits towards the bottom of the diagram.

Although the present invention and its advantages have been described in detail, it should be understood that various changes, substitutions and alterations can be made herein without departing from the spirit and scope of the invention as defined by the appended claims.

What is claimed is:

1. A data processing system having dynamic priority task scheduling capabilities, comprising:

a processor for processing tasks;

a memory, for storing control information and data, associated with said processor;

a system bus for communicating control information and data between said processor and said memory;

a bus controller connected to said processor and to said memory by the system bus and connected to a data bus, said bus controller controls data flow between said processor and said memory, said bus controller includes an integrated plurality of access granting means for dynamically scheduling task requests based on priority level grouping of tasks, time dependent isochronous access of task groups, and round-robin access of tasks within each of the grouping of tasks;

a data bus for communicating data from said processor or said memory to one or more interface units; and said one or more data interface units for communicating control and data signals between said data bus and a plurality of devices requesting access to said processor or said memory.

2. A data processing system, according to claim 1, wherein said integrated plurality of access granting means further comprises:

first means for handling isochronous task requests having a dynamically-variable access time requirement by determining the time dependent isochronous access of task groups;

second means for handling task requests based on a predetermined priority of groups of requesters by determining the grouping of tasks; and third means for handling task requests for one or more tasks in a group having a same predetermined priority.

3. A data processing system, according to claim 1, wherein said integrated plurality of access granting means grants a highest priority to isochronous tasks requests.

4. A data processing system, according to claim 2, wherein said third means grants access to requests having a same priority level on a round robin basis.

5. A data processing system, according to claim 1, wherein said bus controller further comprises:

means for managing a plurality of data buffer registers in response to requests for access to said processor and said memory, wherein at least one of the plurality of data buffer registers stores transmit data until the transmit data is forwarded to a target.

6. A method for dynamically scheduling a plurality of tasks in a data processing system, comprising the steps of:

requesting, by a plurality of tasks, access to elements of said data processing system;

grouping the plurality of requests based on task grouping priority levels;

granting access to a request in a task group having a highest task grouping priority level for requests in task groups having different task grouping priority levels;

determining if two or more requests for access have a same task grouping priority level;

granting, based on a time dependent isochronous task group accessing scheme, to a request in a second task group having a lower task grouping priority level than the task group;

storing said two or more requests in a queue if said determination step indicates two or more requests having a same task grouping priority level;

determining a round robin priority level for the two or more requests;

granting access to each of said two or more requests based on the round robin priority level such that all of said two or more requests are granted access to elements of said processing system; and servicing said requests.

7. A method, according to claim 6, further comprising the steps of:

determining if any of said requests for access is for an isochronous task;

assigning a predetermined time period for each said isochronous task; and granting the highest first priority level to any said request for an isochronous task during said predetermined time period assigned to said task.

8. A task scheduler for scheduling and granting access to system resources in a data processing system in response to a plurality of requests for access, comprising:

means for grouping each of said requests for access based on task grouping priority levels;

means for granting access to a request in a task croup having a highest task grouping priority level among two or more requests in task groups having different task grouping priority levels;

isochronous means for granting access to a second request in a second task group having a lower task grouping priority than the task group in a time dependent isochronous manner;

means for storing said two or more requests in a queue if it is determined that two or more requests have a same task grouping priority level; and means for granting access to each of said two or more requests having a same task grouping priority level in a round-robin manner such that all of said requests are granted access to said system resources.

9. A task scheduler, according to claim 8, said isochronous means further comprising:

means for assigning a predetermined time period for each task for access to system resources.

10. A task scheduler, according to claim 9, wherein said means for assigning a predetermined time period for each task is programmable to permit dynamic modification of said time period in response to requests for access.

* * * * *